(12) United States Patent
Song et al.

(10) Patent No.: US 10,227,009 B2
(45) Date of Patent: Mar. 12, 2019

(54) BATTERY ACCESS SYSTEM AND METHOD

(71) Applicant: LG CHEM, LTD., Seoul (KR)

(72) Inventors: Hyeon Jin Song, Daejeon (KR); Yanglim Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/576,957

(22) PCT Filed: Aug. 30, 2016

(86) PCT No.: PCT/KR2016/009624
§ 371 (c)(1),
(2) Date: Nov. 27, 2017

(87) PCT Pub. No.: WO2017/099332
PCT Pub. Date: Jun. 15, 2017

(65) Prior Publication Data
US 2018/0154795 A1   Jun. 7, 2018

(30) Foreign Application Priority Data

Dec. 10, 2015  (KR) ........................ 10-2015-0175773

(51) Int. Cl.
*B60L 3/04* (2006.01)
*B60L 11/18* (2006.01)
(Continued)

(52) U.S. Cl.
CPC ............... *B60L 3/04* (2013.01); *B60L 3/0046* (2013.01); *B60L 11/18* (2013.01);
(Continued)

(58) Field of Classification Search
CPC ......... B60L 3/04; B60L 3/0046; B60L 3/0069
See application file for complete search history.

(56) References Cited

U.S. PATENT DOCUMENTS

| 8,977,416 B2 | 3/2015 | Park |
| 2010/0214055 A1* | 8/2010 | Fuji .......................... B60L 3/00 340/3.1 |

(Continued)

FOREIGN PATENT DOCUMENTS

| EP | 2 889 984 A1 | 7/2015 |
| JP | 2004-007919 A | 1/2004 |

(Continued)

OTHER PUBLICATIONS

International Search Report for PCT/KR2016/009624 (PCT/ISA/210) dated Dec. 6, 2016.

(Continued)

*Primary Examiner* — Daniel Cavallari-See
(74) *Attorney, Agent, or Firm* — Birch, Stewart, Kolasch & Birch, LLP

(57) ABSTRACT

The present invention relates to a system and a method of connecting a battery, which include a relay unit connected to a battery by a current, and allow a current with a different intensity to flow in the relay unit according to whether force applied to a circuit from the outside is detected and a size of the detected force, thereby maintaining or blocking the connection of the relay unit to the battery in consideration of the detection of the force and the degree of danger of the detected force.

16 Claims, 4 Drawing Sheets

(51) Int. Cl.
*B60L 15/20* (2006.01)
*B60L 15/22* (2006.01)
*B60L 3/00* (2019.01)
*H01M 2/34* (2006.01)

(52) U.S. Cl.
CPC .......... *B60L 11/1851* (2013.01); *B60L 15/20* (2013.01); *B60L 15/22* (2013.01); *H01M 2/347* (2013.01); *Y02T 10/7258* (2013.01)

(56) References Cited

U.S. PATENT DOCUMENTS

2011/0273206 A1    11/2011  Lee
2013/0033794 A1     2/2013  Baek
2015/0165927 A1     6/2015  Jeon et al.

FOREIGN PATENT DOCUMENTS

JP      2014-087081 A     5/2014
JP      2014-207054 A    10/2014
KR   10-2012-0012662 A    2/2012
KR      10-1353953 B1     1/2014

OTHER PUBLICATIONS

Supplementary European Search Report dated Sep. 4, 2018 in EP 16873198.2.

* cited by examiner

[Figure 1]
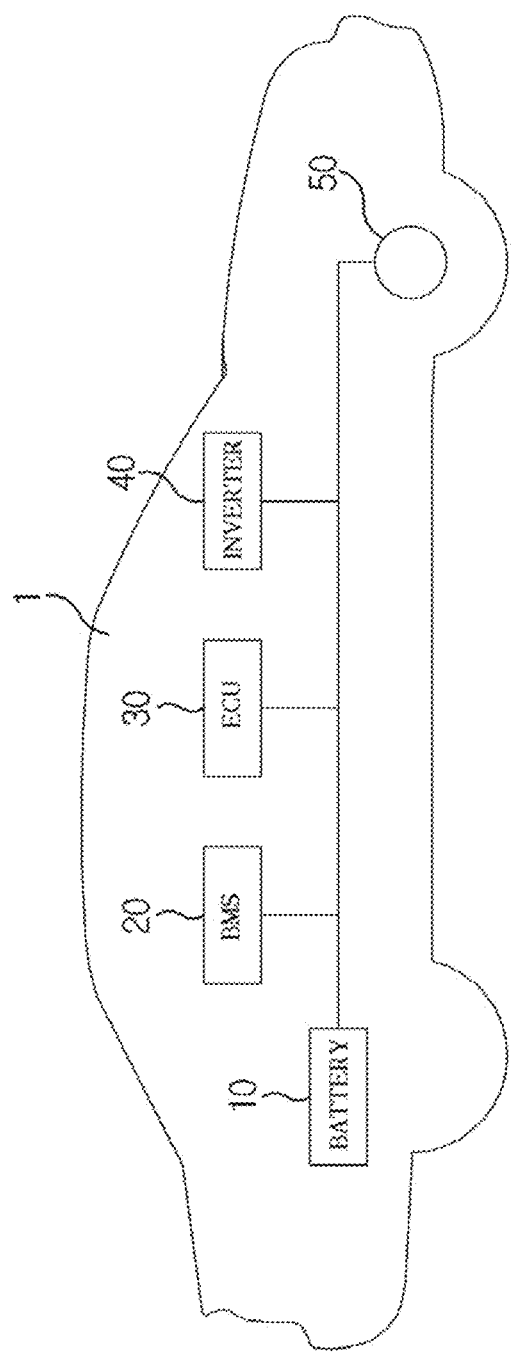

[Figure 2]
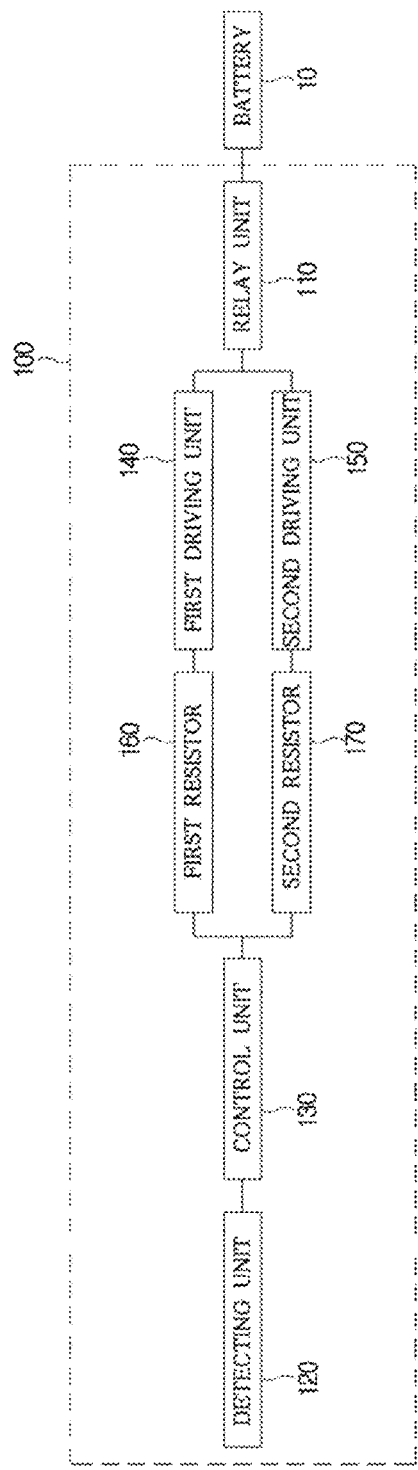

[Figure 3]
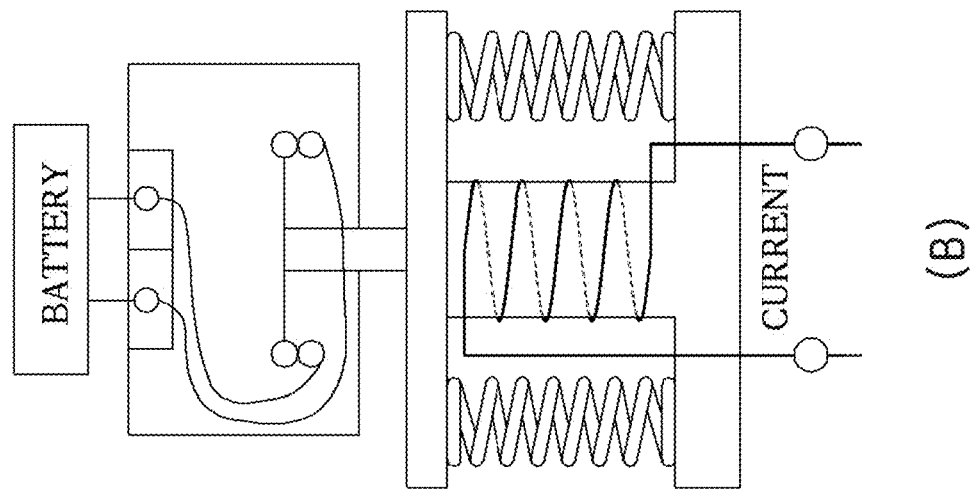
(B)
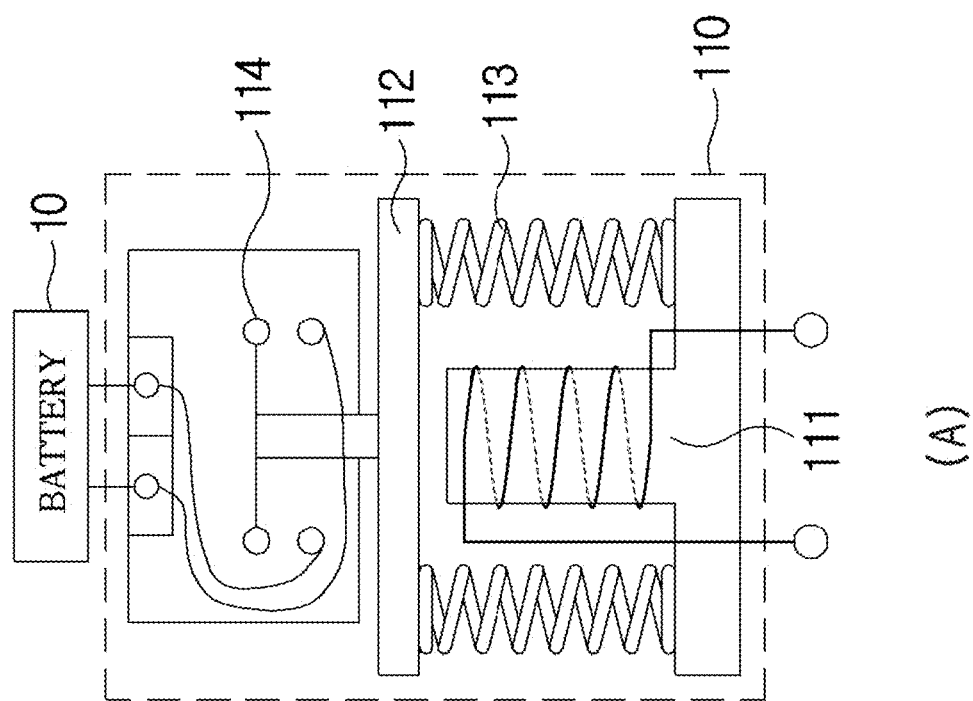
(A)

[Figure 4]
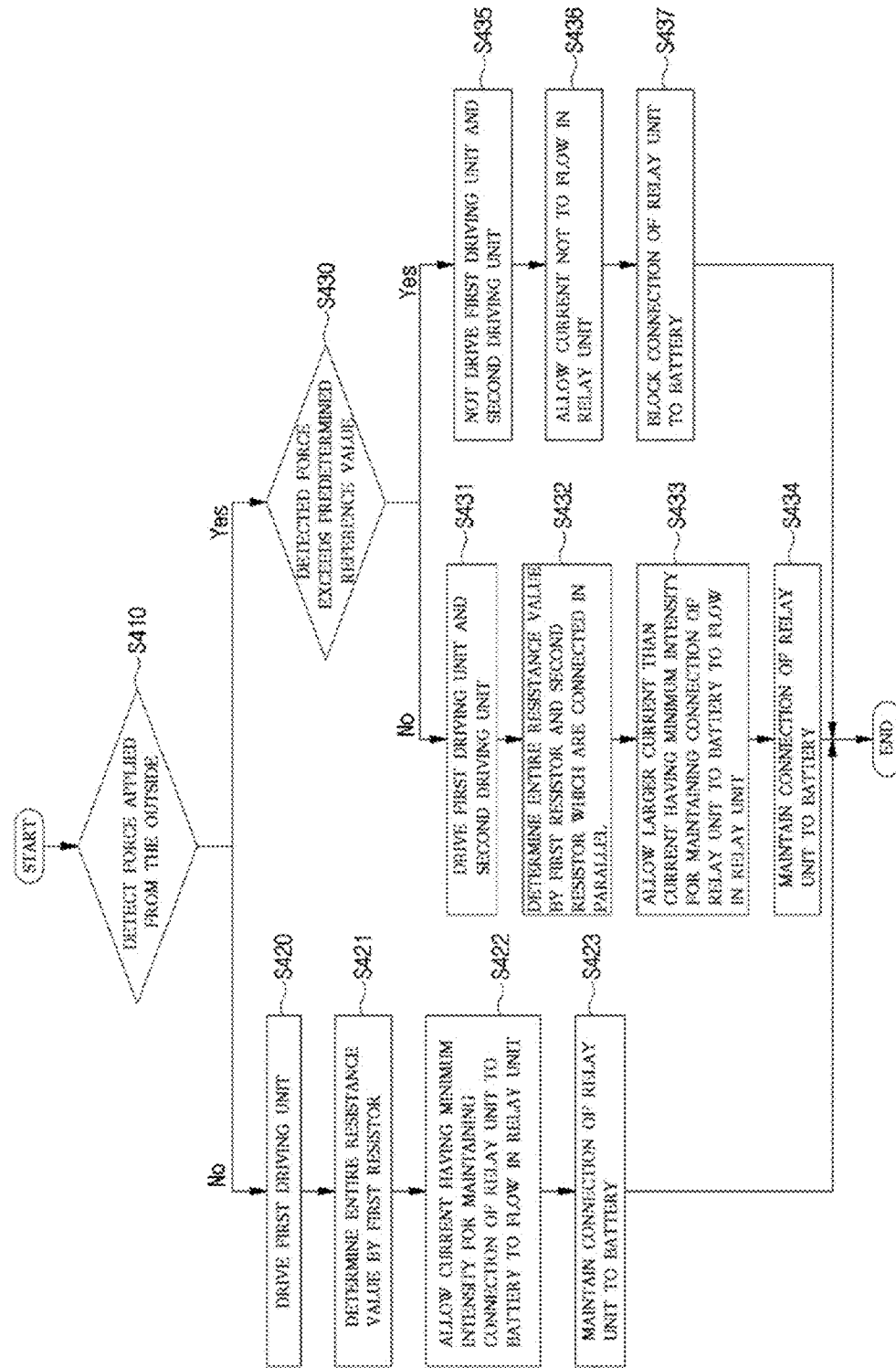

BATTERY ACCESS SYSTEM AND METHOD

TECHNICAL FIELD

This application claims priority to and the benefit of Korean Patent Application No. 10-2015-0175773 filed in the Korean Intellectual Property Office on Dec. 10, 2015, the entire contents of which are incorporated herein by reference.

The present invention relates to a system and a method of connecting a battery, and a system and a method of connecting a battery, which include a relay unit connected to a battery by a current, and allow a current with a different intensity to flow in the relay unit according to whether force applied to a circuit from the outside is detected and a size of the detected force, thereby maintaining or blocking the connection of the relay unit to the battery in consideration of the detection of the force and the degree of danger of the detected force.

BACKGROUND ART

A battery, which is called a storage battery or a secondary battery, has a characteristic in an easy application according to a product group, excellent preservability, a high energy density, and the like.

Further, the battery attracts attention as an energy supply source for improving an environmentally-friendly characteristic and energy efficiency in that a by-product according to the use of energy is not generated, as well as a primary advantage in that it is possible to decrease the use of fossil fuel.

Accordingly, the battery is universally applied to an electric vehicle, an energy storage system, an uninterruptible power supply system, and the like, as well as a portable device.

Particularly, in the case of the electric vehicle industry, the battery is on the rise as an efficient alternative in an era in which a pollution problem become serious day by day and oil price is high, and in Korea, various businesses have been pushed forward to enter the four world powers in an electric vehicle field by the year of 2020.

Unlike an existing vehicle which obtains driving energy by combusting fossil fuel, the electric vehicle has a technical characteristic in that a power source for driving the vehicle is provided from electric energy stored in a battery, and because of this, the battery within the electric vehicle is considered as a core element influencing a determination on a travelling speed and a travelling distance, as well as a stable operation of the vehicle.

Accordingly, various devices and systems are developed for efficiently operating and appropriately protecting the battery of the electric vehicle, and for example, voltage balancing between cells of the battery, overcharging and overdischarging control, a detection of a swelling phenomenon, and an estimation of a residual capacity have been suggested.

However, like the foregoing technologies, most of the related arts about the battery of the electric vehicle consider only a problem in an electric aspect, accidents that occur in the battery and the electric vehicle due to a physical factor are ignored.

For example, when a minor accident is generated during an operation of the electric vehicle or the electric vehicle travels on the ground having severe unevenness, an accident of disconnecting an electric circuit and the battery within the vehicle may be generated due to an impact, a vibration, and the like transferred to a vehicle body, which causes a sudden stop of the operation of the electric vehicle to lead to a secondary accident, and contains a risk in that an electrical short is generated from the battery, so that a body of a person in the vehicle may get an electric shock.

DETAILED DESCRIPTION OF THE INVENTION

Technical Problem

The present invention is conceived to solve the aforementioned problem, and an object of the present invention is to provide a system and a method of connecting a battery, which detect force applied to a circuit from the outside and maintain or block a connection between a relay unit of the circuit and a battery in consideration of the degree of danger of the detected force.

In addition, another object of the present invention is to provide a system and a method of connecting a battery, which minimize a current quantity for maintaining a connection between a relay unit of a circuit and a battery when force from the outside is not detected, thereby improving a residual capacity of the battery that is a current supply source.

Technical Solution

A system for connecting a battery according to an exemplary embodiment of the present invention includes: a relay unit connected to a battery by a current; a first resistor and a second resistor which are connected to the relay unit and are positioned in parallel; a first driving unit provided in a connection path of the relay unit and the first resistor and a second driving unit provided in a connection path of the relay unit and the second resistor; a detecting unit which detects force applied to a circuit from the outside; and a control unit which controls driving of the first driving unit and the second driving unit based on a result of the detection by the detecting unit.

An entire resistance value by the first resistor and the second resistor may be determined according to whether the first driving unit and the second driving unit are driven, and an intensity of a current flowing in the relay unit may be different according to the entire resistance value, so that a connection of the relay unit to the battery may be maintained or blocked.

The first resistor may have a larger resistance value than that of the second resistor.

In order to allow a current having a minimum intensity for maintaining the connection of the relay unit to the battery to flow in the relay unit when only the first driving unit is driven, the first resistor may have a resistance value having a size corresponding to the current having the minimum intensity.

When the detecting unit does not detect the force, the control unit may drive only the first driving unit, so that the current having the minimum intensity may flow in the relay unit and the connection of the relay unit to the battery may be maintained by the current having the minimum intensity.

When the detecting unit detects the force and the detected force is equal to or smaller than a predetermined reference value, the control unit may drive both the first driving unit and the second driving unit, so that a current larger than the current having the minimum intensity may flow in the relay unit by a parallel resistance value of the first resistor and the second resistor which are connected in parallel, and the connection of the relay unit to the battery may be maintained by the larger current than the current having the minimum intensity.

When the detecting unit detects the force and the detected force exceeds the predetermined reference value, the control unit may not drive both the first driving unit and the second driving unit, so that a current may not flow in the relay unit and the connection of the relay unit to the battery may be blocked.

The relay unit may be an electromagnetic relay which is energized when a current flows and of which contact points are closed.

The detecting unit may include one or more sensors for detecting the force.

The force may correspond to one or more of vibration, pitching, and impact.

A method of connecting a battery according to an exemplary embodiment of the present invention includes: serially connecting a first driving unit and a first resistor and serially connecting a second driving unit and a second resistor; positioning the serially connected first driving unit and first resistor and the serially connected second driving unit and second resistor in parallel to connect the resistors to a relay unit connected to a battery by a current; detecting force applied to a circuit from the outside; controlling driving of the first driving unit and the second driving unit based on a result of the detection in the detecting of the force; and determining an entire resistance value by the first resistor and the second resistor according to whether the first driving unit and the second driving unit are driven, and maintaining or blocking a connection of the relay unit to the battery based on a difference in an intensity of a current flowing in the relay unit according to the entire resistance value.

The first resistor may have a larger resistance value than that of the second resistor.

In order to allow a current having a minimum intensity for maintaining the connection of the relay unit to the battery to flow in the relay unit when only the first driving unit is driven, the first resistor may have a resistance value having a size corresponding to the current having the minimum intensity.

The controlling may include driving only the first driving unit when the force is not detected in the detecting of the force.

The maintaining or blocking of the connection of the relay unit to the battery may include making the current having the minimum intensity flow in the relay unit and maintaining the connection of the relay unit to the battery by the current having the minimum intensity.

The controlling may further include, when the force is detected in the detecting of the force and the detected force is equal to or smaller than a predetermined reference value, driving both the first driving unit and the second driving unit.

The maintaining or blocking of the connection of the relay unit to the battery may further include making a current larger than the current having the minimum intensity flow in the relay unit by a parallel resistance value of the first resistor and the second resistor which are connected in parallel, and maintaining the connection of the relay unit to the battery by the larger current than the current having the minimum intensity.

The controlling may further include, when the force is detected in the detecting of the force and the detected force exceeds the predetermined reference value, not driving both the first driving unit and the second driving unit.

The maintaining or blocking of the connection of the relay unit to the battery may further include making a current not flow in the relay unit and blocking the connection of the relay unit to the battery.

The relay unit may be an electromagnetic relay which is energized when a current flows and of which contact points are closed.

The detecting of the force may use one or more sensors for detecting the force.

The force may correspond to one or more of vibration, pitching, and impact.

Advantageous Effects

In the system and the method of connecting a battery according to the exemplary embodiment of the present invention, when force applied to a circuit from the outside is not detected, a connection between the relay unit and the battery is maintained by a current having a minimum intensity, thereby decreasing a discharged quantity of the battery that is a current supply source, and increasing an available residual capacity.

In contrast to this, when force which is applied to the circuit from the outside and has a predetermined reference value or smaller is detected, a connection of the relay unit to the battery is maintained by a larger current than the current having the minimum intensity, so that it is possible to prevent the connection of the relay unit to the battery from being released due to slight vibration, pitching, impact, and the like, and when the force exceeding the reference value is detected, the connection of the relay unit to the battery is blocked, thereby protecting the battery from excessive vibration, pitching, impact, and the like.

BRIEF DESCRIPTION OF DRAWINGS

FIG. 1 is a diagram schematically illustrating an electric vehicle, to which a system and a method of connecting a battery according to an exemplary embodiment of the present invention are applicable.

FIG. 2 is a circuit diagram of a battery connecting system according to an exemplary embodiment of the present invention.

FIG. 3 is a diagram schematically illustrating a characteristic of a relay unit that is a constituent element of the battery connecting system according to the exemplary embodiment of the present invention.

FIG. 4 is a flowchart for describing a battery connecting method according to an exemplary embodiment of the present invention.

MODE FOR CARRYING OUT THE INVENTION

The present invention will be described in detail below with reference to the accompanying drawings. Herein, a repeated description, and the detailed description of a known function and configuration that may make the purpose of the present invention unnecessarily ambiguous will be omitted. Exemplary embodiments of the present invention are provided so as to more completely explain the present invention to those skilled in the art. Accordingly, the shape, the size, etc., of elements in the drawings may be exaggerated for a more clear description.

Throughout the specification, unless explicitly described to the contrary, when it is said that a specific part "comprises" a specific constituent element, it means that other constituent elements may be further included, not that other constituent elements are excluded.

In addition, the term " . . . unit" described in the specification means a unit for processing one or more functions or operations and may be implemented by hardware or software and a combination of hardware and software.

FIG. 1 is a diagram schematically illustrating an electric vehicle 1, to which a system and a method of connecting a battery according to an exemplary embodiment of the present invention are applicable.

However, the system and the method of connecting the battery according to the exemplary embodiment of the present invention may be applied to various technical fields, to which a battery is applied and simultaneously, in which force, such as impact and vibration, may accompany in an operation or driving, as well as the electric vehicle 1.

Referring to FIG. 1, the electric vehicle 1 may include a battery 10, a battery management system (BMS) 20, an electronic control unit (ECU) 30, an inverter 40, and a motor 50.

The battery 10 is an electric energy source providing driving force to the motor 50 and driving the electric vehicle 1, and may be charged or discharged by the inverter 40 according to the driving of the motor 50 and/or an internal combustion engine (not illustrated).

Herein, the kind of battery 10 is not particularly limited, and examples of the battery 10 may include a lithium ion battery, a lithium polymer battery, a nickel cadmium battery, a nickel hydrogen battery, a nickel zinc battery, and the like.

For example, the BMS 20 may estimate state information, such as a state of charging (SOC), a state of health (SOH), the amount of maximum input/output allowance power, and an output voltage, of the battery 10 and control charging and discharging of the battery 10 by using the state information.

Further, in the exemplary embodiment, the BMS 20 may include a battery connecting system 100 (see FIG. 2) according to the present invention, and may be connected with the battery 10 or a connection between the BMS 20 and the battery 10 may be blocked based on the driving of the battery connecting system.

The ECU 30 is an electronic control apparatus controlling a state of the electric vehicle 1, and for example, the ECU 30 may determine the degree of torque based on information about an accelerator, a break, a speed, and the like, and control an output of the motor 50 to correspond to the torque information.

The inverter 40 may receive a charging/discharging control signal of the battery 10 from the ECU 30 and make the battery 10 be charged or discharged based on the charging/discharging control signal of the ECU 30, and the motor 50 may drive the electric vehicle 1 based on electric energy of the battery 10 and the control information transmitted from the ECU 30.

As described above, in order to promote the electric vehicle 1, driving force needs to be provided to wheels of the vehicle through an interconnecting operation of constituent elements, and to this end, the constituent elements need to be electrically connected through various circuits.

In this case, a current having a different potential difference from a micro-current to a high current may flow in the circuit, and in order to protect the constituent elements from the current, a circuit protecting device, such as a relay, needs to be provided within the circuit.

The system and the method of connecting the battery according to the present invention aim to stably connect the circuit and the battery 10 through an appropriate connection of the relay to the battery 10, and particularly, aim to enable the battery 10 to be normally operated by appropriately maintaining the connection of the relay to the battery 10 from force, such as impact and vibration, transmitted to the electric vehicle, and protect the battery 10 by blocking the connection depending on a situation.

Hereinafter, the system and the method of connecting the battery according to the present invention will be described with reference to FIGS. 2 to 4.

FIG. 2 is a circuit diagram of a battery connecting system 100 according to an exemplary embodiment of the present invention.

Referring to FIG. 2, the battery connecting system 100 according to the exemplary embodiment of the present invention may include a relay unit 110, a detecting unit 120, a control unit 130, a first driving unit 140, a second driving unit 150, a first resistor 160, and a second resistor 170.

However, the battery connecting system 100 illustrated in FIG. 2 is an exemplary embodiment, and it is noted that constituent elements thereof are not limited to the exemplary embodiment illustrated in FIG. 2, and some constituent elements may be added, changed, or removed as necessary.

Further, in the exemplary embodiment, it is noted that the battery connecting system 100 may be implemented with the BMS 20 (see FIG. 1) itself, or may also be separately included in the BMS 20 (see FIG. 1).

First, the relay unit 110 may be positioned at a distal end of a circuit, in which the constituent elements 120 to 170 are provided, and be connected to the battery 10 to serve to electrically connect the constituent elements 120 to 170 with the battery 10.

Herein, a configuration and a characteristic of the relay unit 110 will be described with reference to FIG. 3. The relay unit 110 may be implemented with an electromagnetic relay which has an energized characteristic when a current flows, and may include a solenoid 111, an iron piece 112, springs 113, and contact points 114 as the configuration.

Particularly, when a current does not flow into the relay unit 110 as illustrated in FIG. 3A, the solenoid 111 is not energized and does not exert magnetic force to the iron piece 112, and thus, the contact points 114 are not closed toward terminals connected with the battery 10.

In the meantime, when a current flows into the relay unit 110 as illustrated in FIG. 3B, the solenoid 111 is energized by the current, and the solenoid 111 is magnetized and the iron piece 112 moves down while compressing the sprints 113, so that the contact points 114 are closed toward the terminals connected with the battery 10.

In this case, the electromagnetic relay implemented as the relay unit 110 may be formed in a temporary type in which opening/closing of the contact point 114 is immediately performed.

As described above, the contact point 114 is operated according to the inflow of the current, so that the relay unit 110 may be connected to the battery 10 or the connection between the relay unit 110 and the battery 10 may be blocked, and in the exemplary embodiment, it is noted that the driving of the battery connecting system 100 according to the present invention is initiated in the state where the relay unit 110 is connected to the battery 10.

Referring back to FIG. 2, the detecting unit 120 may serve to detect force applied to the circuit from the outside, and serve to provide a result of the detection to the control unit 130 which is to be described below.

Herein, the force is a concept including vibration, pitching, impact, and the like, and in order to detect the force, the detecting unit 120 may include one or more of, for example, an impact detecting sensor, a vibration detecting sensor, and a motion detecting sensor detecting pitching of the circuit according to impact and vibration.

The control unit 130 may determine whether force is applied based on the result of the detection provided from the detecting unit 120, compare detected force with a predetermined reference value when the force is detected, and determine whether the detected force exceeds the reference value. Further, the control unit 130 may control driving of the first driving unit 140 and the second driving unit 150 based on the determination.

In the exemplary embodiment, the first driving unit 140 and the second driving unit 150 may be implemented in a form of a switch, and the driving of the driving units 140 and 150 may mean the case where the driving units 140 and 150 are operated to be on to close the circuit. On the contrary, the circuit is opened when the driving units 140 and 150 are not driven.

More particularly, the first driving unit 140 and the second driving unit 150 are positioned in parallel to be connected to the relay unit 110, and the first resistor 160 may be connected to the first driving unit 140 and the second resistor 170 may be connected to the second driving unit 150.

That is, the first resistor 160 is serially connected to the first driving unit 140 and the second resistor 170 is serially connected to the second driving unit 150, and the first driving unit 140 and the first resistor 160, and the second driving unit 150 and the second resistor 170 may be positioned in parallel to be connected to the relay unit 110.

In the meantime, when the detecting unit 120 determines that the force is not detected, the control unit 130 may control only the first driving unit 140 to be driven.

Accordingly, a path in the circuit, in which the first driving unit 140 is positioned, is closed, a path in the circuit, in which the second driving unit 150 is positioned, is opened, and an entire resistance value of the circuit may be determined by the first resistor 160.

In this case, the first resistor 160 may be formed to have a larger resistance value than that of the second resistor 170. Further, in order to allow a current having a minimum intensity for maintaining the existing connection between the relay unit 110 and the battery 10, that is, a current having a minimum required intensity, by which the solenoid 111 (see FIG. 3) of the relay unit 110 is energized to make the contact point 114 (see FIG. 3) be closed to the terminals connected with the battery 10, to flow to the relay unit 110 when only the first driving unit 140 is driven, the resistance value of the first resistor 160 may be formed to have a size corresponding to the current.

Accordingly, when only the first driving unit 140 is driven, the connection of the relay unit 110 with the battery 10 may be maintained with the foregoing minimum intensity by the first resistor 160.

In the meantime, when the detecting unit 120 determines that the force is detected and the detected force is determined to be equal to or smaller than the predetermined reference value, the control unit 130 may control both the first driving unit 140 and the second driving unit 150 to be driven.

In this case, all of the paths in the circuits, in which the first driving unit 140 and the second driving unit 150 are positioned, respectively, are closed, and an entire resistance value of the circuit may be determined by the first resistor 160 and the second resistor 170.

In this case, the first resistor 160 and the second resistor 170 are positioned in parallel, so that an entire resistance value of the circuit may be determined by an equation below which calculates an entire resistance value of the parallel circuit.

$$\frac{1}{R_T} = \frac{1}{R_1} + \frac{1}{R_2}$$ [Equation 1]

Herein, $R_T$ is the entire resistors
$R_1$ is the first resistor
$R_2$ is the second resistor That is, an entire resistance value of the circuit when both the first driving unit 140 and the second driving unit 150 are driven is smaller than an entire resistance value of the circuit when only the first driving unit 140 is driven, and this may mean that an intensity of a current flowing into the relay unit 110 when force is detected is larger than an intensity of a current flowing into the relay unit 110 when force is not detected.

Accordingly, when the force having the value that is equal to or smaller than the reference value is detected and both the first driving unit 140 and the second driving unit 150 are driven, the connection of the relay unit 110 to the battery 10 may be maintained with a larger current than the current having the foregoing minimum intensity by a parallel resistance value of the first resistor 160 and the second resistor 170.

Last, when the detecting unit 120 determines that the force is detected and the detected force is determined to exceed the reference value, the control unit 130 may control both the first driving unit 140 and the second driving unit 150 not to be driven.

In this case, all of the paths on the circuit, in which of the first driving unit 140 and the second driving unit 150 are positioned, respectively, are opened, so that the current does not flow in the relay unit 110 and the relay unit 110 is not energized, so that the contact points 114 (see FIG. 3) may be opened.

Accordingly, the existing connection of the relay unit 110 to the battery 10 is blocked, so that it is possible to prevent an abnormal problem of the circuit of the battery 100 generable due to the force exceeding the reference value.

FIG. 4 is a flowchart for describing a battery connecting method according to an exemplary embodiment of the present invention.

When the battery connecting method according to the exemplary embodiment of the present invention starts, the detecting unit detects force applied to a circuit from the outside, and the control unit determines whether the force is detected based on a result of the detection (S410).

When it is determined that the force is not detected, the control unit drives only the first driving unit (S420), so that a path in the circuit, in which the first driving unit is positioned, is closed, and a path in the circuit, in which the second driving unit is positioned, is opened.

Accordingly, an entire resistance value of the circuit is determined by the first resistor that is serially connected to the first driving unit (S421), and in this case, in order to allow a current having a minimum intensity for maintaining the connection of the relay unit to the battery to flow to the relay unit when only the first driving unit is driven, the first resistance value is set with a size corresponding to the current having the minimum intensity, so that the current having the minimum intensity flows in the relay unit (S422) and the existing connection of the battery is maintained (S423).

In the meantime, when it is determined that the force is detected, the control unit determines whether the detected force exceeds a predetermined reference value (S430).

When it is determined that the detected force is equal to or smaller than the reference value, the control unit controls both the first driving unit and the second driving unit to be driven (S431), and the paths in the circuit, in which the first driving unit and the second driving unit are positioned, respectively, are closed.

In this case, an entire resistance value of the circuit is determined by the first resistor and the second resistor which are connected to each other in parallel (S432), and the entire resistance value of the circuit is smaller than an entire resistance value when only the first driving unit is driven by the parallel resistance value of the first resistor and the second resistor.

Accordingly, a larger current than the current having the minimum intensity flows in the relay unit (S433), so that the existing connection of the relay unit to the battery is maintained from the force having the reference value or less (S434).

When the detected force exceeds the reference value, the control unit controls both the first driving unit and the second driving unit not to driven (S435).

Accordingly, all of the paths in the circuit, in which the first driving unit and the second driving unit are positioned, respectively, are opened, so that the current does not flow into the relay unit (S436).

According to the characteristic of the relay unit which is energized by a current and is connected to the battery, when the current does not flow into the relay unit as described above, the existing connection with the battery is blocked (S437), so that an abnormal problem of the circuit of the battery generable from the force exceeding the reference value is prevented.

In the forgoing, the specific exemplary embodiment of the present invention has been illustrated and described, but it is apparent to those skilled in the art that the technical spirit of the present invention is not limited by the accompanying drawings and the described contents, and may be modified in various forms without departing from the spirit of the present invention, and the modifications are considered to belong to the claims of the present invention without departing from the spirit of the present invention.

The invention claimed is:

1. A system for connecting a battery, the system comprising:
   a relay connected to a battery by a current;
   a first resistor and a second resistor which are connected to the relay and are positioned in parallel;
   a first driver provided in a connection path of the relay and the first resistor and a second driver provided in a connection path of the relay and the second resistor;
   a detector which detects force applied to a circuit from the outside; and
   a controller which controls driving of the first driver and the second driver based on a result of the detection by the detector,
   wherein an entire resistance value by the first resistor and the second resistor is determined according to whether the first driver and the second driver are driven, and an intensity of a current flowing in the relay is different according to the entire resistance value, so that a connection of the relay to the battery is maintained or blocked.

2. The system of claim 1, wherein the first resistor has a larger resistance value than that of the second resistor, and in order to allow a current having a minimum intensity for maintaining the connection of the relay to the battery to flow in the relay when only the first driver is driven, the first resistor has a resistance value having a size corresponding to the current having the minimum intensity.

3. The system of claim 2, wherein when the detector does not detect the force, the controller drives only the first driver, so that the current having the minimum intensity flows in the relay and the connection of the relay to the battery is maintained by the current having the minimum intensity.

4. The system of claim 3, wherein when the detector detects the force and the detected force is equal to or smaller than a predetermined reference value, the controller drives both the first driver and the second driver, so that a current larger than the current having the minimum intensity flows in the relay by a parallel resistance value of the first resistor and the second resistor which are connected in parallel, and the connection of the relay to the battery is maintained by the larger current than the current having the minimum intensity.

5. The system of claim 4, wherein when the detector detects the force and the detected force exceeds the predetermined reference value, the controller does not drive both the first driver and the second driver, so that a current does not flow in the relay and the connection of the relay to the battery is blocked.

6. The system of claim 1, wherein the relay is an electromagnetic relay which is energized when a current flows and of which contact points are closed.

7. The system of claim 1, wherein the detector includes one or more sensors for detecting the force.

8. The system of claim 1, wherein the force corresponds to one or more of vibration, pitching, and impact.

9. A method of connecting a battery, the method comprising:
   serially connecting a first driver and a first resistor and serially connecting a second driver and a second resistor;
   positioning the serially connected first driver and first resistor and the serially connected second driver and second resistor in parallel to connect the resistors to a relay connected to a battery by a current;
   detecting force applied to a circuit from the outside;
   controlling driving of the first driver and the second driver based on a result of the detection in the detecting of the force; and
   determining an entire resistance value by the first resistor and the second resistor according to whether the first driver and the second driver are driven, and maintaining or blocking a connection of the relay to the battery based on a difference in an intensity of a current flowing in the relay according to the entire resistance value.

10. The method of claim 9, wherein the first resistor has a larger resistance value than that of the second resistor, and in order to allow a current having a minimum intensity for maintaining the connection of the relay to the battery to flow in the relay when only the first driver is driven, the first resistor has a resistance value having a size corresponding to the current having the minimum intensity.

11. The method of claim 10, wherein the controlling includes driving only the first driver when the force is not detected in the detecting of the force, and
   the maintaining or blocking of the connection of the relay to the battery includes making the current having the minimum intensity flow in the relay and maintaining the connection of the relay to the battery by the current having the minimum intensity.

12. The method of claim 11, wherein the controlling further includes, when the force is detected in the detecting of the force and the detected force is equal to or smaller than a predetermined reference value, driving both the first driver and the second driver, and the maintaining or blocking of the connection of the relay to the battery further includes making a current larger than the current having the minimum intensity flow in the relay by a parallel resistance value of the first resistor and the second resistor which are connected in parallel, and maintaining the connection of the relay to the battery by the larger current than the current having the minimum intensity.

13. The method of claim 12, wherein the controlling further includes, when the force is detected in the detecting of the force and the detected force exceeds the predetermined reference value, not driving both the first driver and the second driver, and the maintaining or blocking of the connection of the relay to the battery further includes making a current not flow in the relay and blocking the connection of the relay to the battery.

14. The method of claim 9, wherein the relay is an electromagnetic relay which is energized when a current flows and of which contact points are closed.

15. The method of claim 9, wherein the detecting of the force uses one or more sensors for detecting the force.

16. The method of claim 9, wherein the force corresponds to one or more of vibration, pitching, and impact.

* * * * *